United States Patent
Shaft et al.

(10) Patent No.: US 8,892,536 B2
(45) Date of Patent: Nov. 18, 2014

(54) METHODS FOR RESOLVING A HANG IN A DATABASE SYSTEM

(71) Applicant: Oracle International Corporation, Redwood City, CA (US)

(72) Inventors: Uri Shaft, Fremont, CA (US); Amirali Valiani, San Jose, CA (US); Peter Belknap, Redwood City, CA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/627,967

(22) Filed: Sep. 26, 2012

(65) Prior Publication Data

US 2014/0089268 A1  Mar. 27, 2014

(51) Int. Cl.
*G06F 7/02* (2006.01)
*G06F 17/30* (2006.01)

(52) U.S. Cl.
USPC ............ 707/704; 707/687; 707/781; 707/787

(58) Field of Classification Search
None
See application file for complete search history.

(56) References Cited

U.S. PATENT DOCUMENTS

| | | | |
|---|---|---|---|
| 7,403,945 B2 * | 7/2008 | Lin et al. | 1/1 |
| 2007/0106667 A1 * | 5/2007 | Jain et al. | 707/8 |
| 2010/0293154 A1 * | 11/2010 | Lyons | 707/704 |

* cited by examiner

*Primary Examiner* — Bruce Moser
(74) *Attorney, Agent, or Firm* — Martine Penilla Group, LLP (57) ABSTRACT

A method for resolving a hang in a database system includes receiving a symbolic graph having a plurality of nodes, where each node represents a database session involved in the hang during a specified time interval. The blocking time associated with each node in the symbolic graph is recursively determined. The node that has the longest blocking time is output to a display for review by the database administrator. Alternatively, the database session represented by the node having the longest blocking time may be automatically eliminated.

20 Claims, 4 Drawing Sheets

METHODS FOR RESOLVING A HANG IN A DATABASE SYSTEM

BACKGROUND

A database is an organized collection of data, typically in digital form. A database may be managed and maintained by at least one instance of database management software that allows different users to concurrently access the same database. When a user starts to access the database, a database session associated with the user is created.

However, many database resources, though sharable, may not be accessed in certain ways by more than one database session at any given time. For example, database resources, such as a data table stored in data storage, may be concurrently accessed in some ways (e.g., read) by multiple database sessions, but accessed in other ways (e.g., written to) by only one database session at a time. Thus, a group of database sessions may have to wait for one or more database resources, if the database resources are being held by another group of database sessions, which causes a hang in the database system.

It is within this context that embodiments arise.

SUMMARY

Embodiments set forth in this disclosure provide methods and systems for identifying a top blocking session in a database system. It should be appreciated that the present embodiments can be implemented in numerous ways, such as a process, an apparatus, a system, a device or a method on a computer readable non-transitory medium. Several embodiments are described below.

In one embodiment, a first method for resolving a hang in a database is provided. In this method, a symbolic graph having a plurality of nodes is received. Each node represents a database session involved in the hang during a specified time interval. The blocking time associated with each node in the symbolic graph is recursively determined. The node that has the longest blocking time is output to a display so that it can be reviewed by a database administrator.

In another embodiment, a second method for resolving a hang in a database is provided. In this method, a symbolic graph having a plurality of nodes is received. Each node represents a database session involved in a hang during a specified time interval. The blocking time associated with each node in the symbolic graph is recursively determined. The node that has the longest blocking time is automatically eliminated, e.g., by the database management software.

In yet another embodiment, a computer program embedded in a non-transitory computer-readable storage medium is provided. The computer program, when executed by one or more processors, may perform the operations of receiving a symbolic graph having a plurality of nodes with each node representing a database session involved in a hang during a specified time interval, recursively determining a blocking time associated with each node in the symbolic graph, and outputting the node having a longest blocking time.

Other aspects of the invention will become more apparent from the following detailed description, taken in conjunction with the accompanying drawings, illustrating by way of example the present invention.

DETAILED DESCRIPTION

The following embodiments relate to methods and systems for resolving a hang in a database. It should be appreciated that the present invention can be implemented in numerous ways, including as a process, an apparatus, a system, a device, or a method. Several exemplary embodiments of the invention will now be described in detail with reference to the accompanying drawings. In the following description, numerous specific details are set forth in order to provide a thorough understanding of the present invention. It will be apparent, however, to one skilled in the art that the present invention may be practiced without some or all of these specific details. In other instances, well known process operations have not been described in detail to avoid unnecessarily obscuring the present invention.

Figure 1:
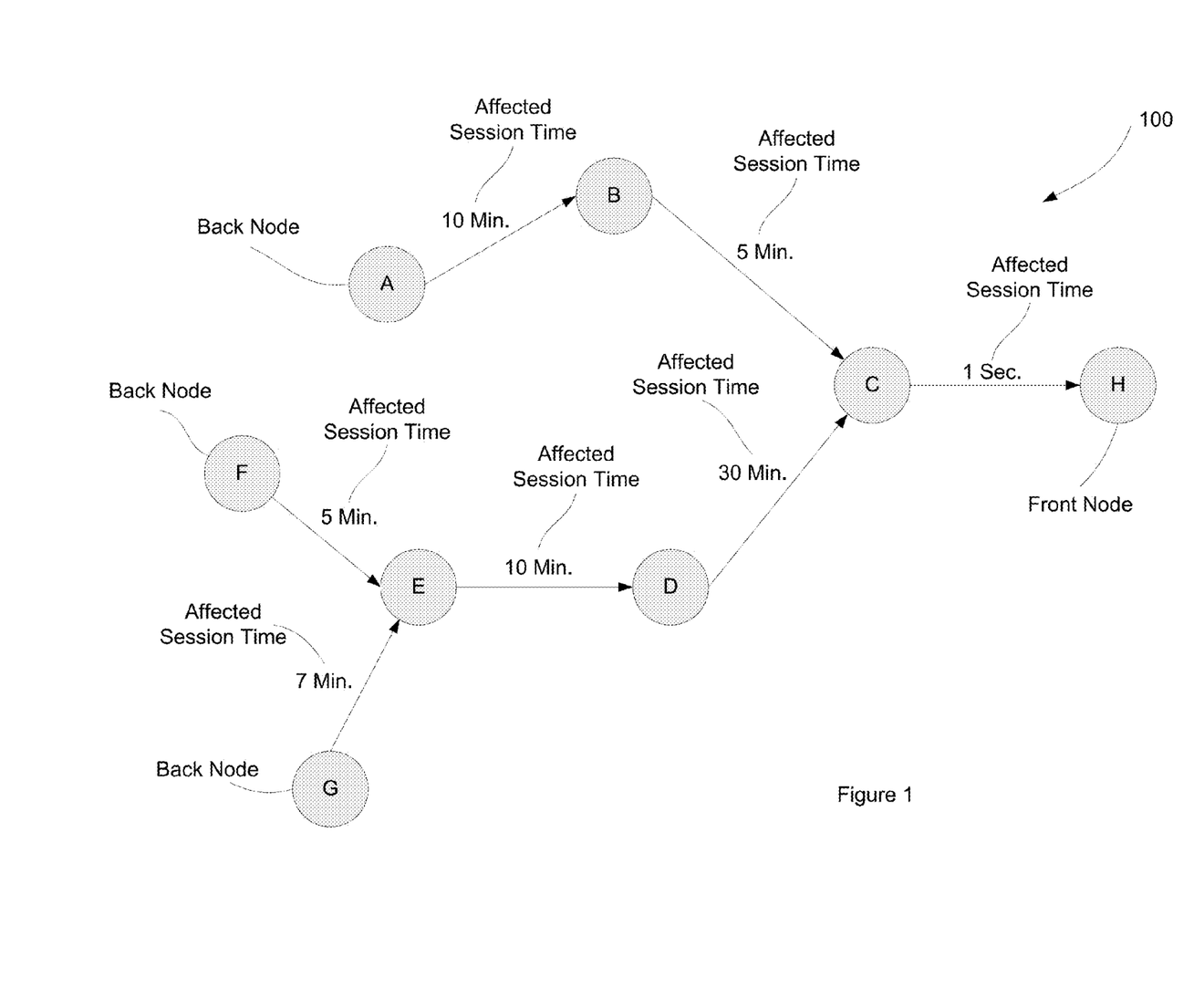
FIG. 1 illustrates one embodiment of a symbolic graph representing a plurality of database sessions involved in a hang in a database system during a specified time interval.

FIG. 1 illustrates one embodiment of a symbolic graph 100 representing a plurality of database sessions involved in a hang in a database system during a specified time interval. The symbolic graph 100 includes eight circular nodes (node A, node B, node C, node D, node E, node F, node G, and node H) with each circular node (or simply "node") representing a database session (or simply "session") that is hanging in the database system during the specified time interval. The specified time interval could be any specified past time period for the database system. In one embodiment, the specified time interval may be the last 10 minutes of the database system time. In another embodiment, the specified time interval may be defined through user input. For example, a computer program may be used to obtain the specified time interval from a user through an appropriate graphical user interface (GUI). Although eight nodes that represent eight sessions are shown in the symbolic graph 100, it is to be understood that in practice, the number of sessions that may be involved in a database hang can vary.

As shown in FIG. 1, the node that is waiting for a database resource is coupled by an arrow to another node that is holding the requested database resource, with the tail of the arrow coupled to the node that is waiting for the database resource and the head of the arrow coupled to the node that is holding the database resource. For example, node A is waiting for a database resource held by node B. Node A is coupled to node B by an arrow with the tail of the arrow coupled to node A and the head of the arrow coupled to node B. Except for node H, all of the other nodes in the symbolic graph 100 are waiting for one or more database resources in the database system.

The time shown above an arrow that couples a pair of nodes in the symbolic graph 100 represents the affected session time associated with the node coupled to the tail of the arrow. The affected session time associated with a node indicates the length of time for which the node has been waiting for a database resource held by another node coupled to the head of the arrow. For example, node A has been waiting for a database resource held by node B for 10 minutes; therefore, the affected session time associated with node A is 10 minutes. In another example, node B has been waiting for a database resource held by node C for 5 minutes, and thus the affected session time associated with node B is 5 minutes. In yet another example, node C has been waiting for a database resource held by node H for 1 second, and the affected session time associated with node C is 1 second. In one embodiment, the database sessions involved in a hang and the respective affected session time may be provided by a hang manager in the database management software that manages the database system.

With continuing reference to FIG. 1, node H that is not waiting for any database resources is called the root of the symbolic graph 100 or a front node, while node A, node F, and node G that are not holding any database resources for any nodes are called back nodes. Although one front node and three back nodes are shown in the symbolic graph 100, it is to be understood that in practice, the number of front nodes or back nodes in a symbolic graph can vary.

In symbolic graph 100, a prior node of any given node is a node that is waiting for a database resource held by that node. In a symbolic graph, each node, except for the back nodes, has one or more prior nodes. Each prior node may have one or more successive prior nodes. For example, as shown in FIG. 1, if node H is the selected node, node H has one prior node (node C), the prior node C of the selected node H has two successive prior nodes (node B and node D), the successive prior node B has one further successive prior node A, the successive prior node D has one further successive prior node E, and the further successive prior node E has two further successive prior nodes (node F and node G).

One way to eliminate the hang shown in FIG. 1 is to eliminate the root of the symbolic graph 100, node H, without considering the affected session time associated with the other nodes in the symbolic graph 100. However, since node H has been holding a database resource requested by node C for only 1 second, node H is merely responsible for 7 seconds of the hang time for the other nodes (e.g., 1 second for node A, 1 second for node B, 1 second for node C, 1 second for node D, 1 second for node E, 1 second for node F, and 1 second for node G). Considering that node A, node B, node D, node E, node F, and node G have been waiting for one or more database resources held by node C much longer than the affected session time (1 second) associated with node C, eliminating node H in this case may not eliminate the hang in which node A, node B, node C, node D, node E, node F, and node G are involved, especially when node H is merely a transient node.

Figure 2:
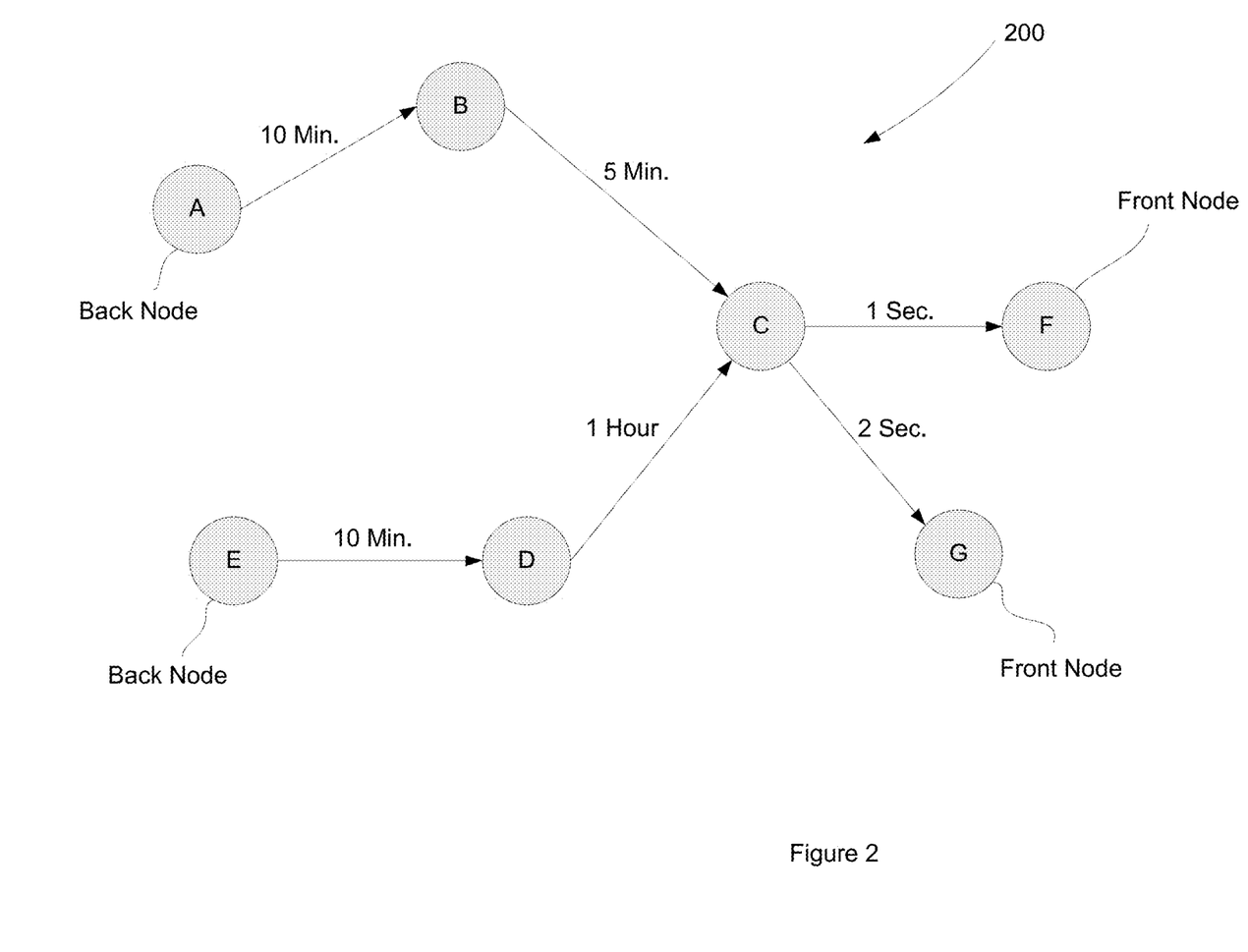
FIG. 2 illustrates one embodiment of a symbolic graph representing a plurality of database sessions involved in a hang in a database system during a specified time interval.

FIG. 2 illustrates one embodiment of a symbolic graph 200 representing a plurality of database sessions involved in a hang in a database during a specified time interval. The symbolic graph 200 includes seven circular nodes (node A, node B, node C, node D, node E, node F, and node G) with each circular node (or simply "node") representing a database session (or simply "session") that is involved in a hang in the database during the specified time interval. Similar to the symbolic graph 100 shown in FIG. 1, the time shown above each arrow in the symbolic graph 200 represents the affected session time associated with the node coupled to the tail of each arrow.

In one embodiment, the hang shown in FIG. 2 may be resolved by identifying a node having the longest blocking time as a candidate for elimination. After determining the blocking time associated with each node in the symbolic graph 200, the plurality of nodes in the symbolic graph 200 may be ranked based on the determined blocking time associated with each node. Thus, the node with the longest blocking time can be identified based on the ranking. The node with the longest blocking time represents the top blocking database session. The node having the longest blocking time may be output to display. In one embodiment, the database session represented by the node having the longest blocking time may be identified as the candidate for elimination. Alternatively, the database session represented by the node having the longest blocking time may be eliminated.

The blocking time associated with each node (or session) can be determined by the following recursive algorithm:

BlockingTime (Graph, Session, Max_Time)
(1) Result = 0
(2) For each Prior Session S
    T = Min (Max_Time, AffectedSessionTime (S→Session))
    Result = Result + BlockingTime (Graph, S, T) + T
(3) Return Result.

In this algorithm, the parameter "Graph" represents a symbolic graph, e.g., the symbolic graph 200. The parameter "Session" could be any identified session represented by a selected node in a symbolic graph. The parameter "Max_Time" may be the specified time interval, which can be defined by a database administrator or provided by the database system. Alternatively, the "Max_Time" may be defined by user input. The "Prior Session S" means all of the sessions represented by the prior nodes of the selected node. For example, in the symbolic graph 200, session C, represented by node C, is the prior session of session F and session G that are respectively represented by node F and node G. In another example, session B and session D, represented respectively by node B and node D, are the prior sessions of session C represented by node C.

Referring again to the recursive algorithm, the "BlockingTime (Graph, S, T)" represents a blocking time attributable to a prior node of the selected node. The "Result" represents the blocking time associated with the selected node. In the algorithm, when calculating a blocking time associated with a selected node, the blocking time attributable to each prior node of the selected node needs to be determined first, before the calculation of the blocking time associated with the selected node. If the prior node has any successive prior nodes, the blocking time attributable to each successive prior node of the prior node needs to be determined first by the function of "BlockingTime (Graph, S, T)," before the calculation of the blocking time attributable to the prior node. If a successive prior node has any further successive prior node, the blocking time attributable to the further successive prior node needs to be calculated first by the function of "BlockingTime (Graph, S, T)," before the calculation of the blocking time attributable to the successive prior node. The calculation for the blocking time attributable to a prior node, a successive prior node, or any further successive prior node continues until the prior node or the successive prior node is a back node.

In the embodiment shown in FIG. 2, node F and node G are the front nodes; node A and node E are the back nodes. Node C is the prior node of node F and node G. Node B and node D are the prior nodes of node C. Node A is the prior node of node B. Node E is the prior node of node D. As discussed above, the blocking time associated with a given or selected node in a symbolic graph can be calculated or determined by the recursive algorithm described herein.

In one example, as shown in symbolic graph 200, node F (that represents the session F in a database system) has one prior node, node C (that represents session C in the database system). When node F is a selected node, the blocking time associated with node F can be calculated by the following recursive algorithm based on the defined Max_Time (in this example, the "Max_Time" is set to be 10 minutes) and the affected session time associated with the prior nodes of node F:

```
BlockingTime (Symbolic Graph 200, Session F, 10 min.)
Result = 0
For Prior Session C
    T = Min (10 min., 1 sec.) = 1 sec.
    Result = 0 + BlockingTime (Symbolic Graph 200, Session C,
    1 sec.) + 1 sec.
Return Result.
```

In this recursive algorithm, the minimized time "T" is chosen between the Max_Time (10 minutes) and the affected session time associated with node C (1 second). In order to determine the blocking time associated with the selected node F, the blocking time attributable to the prior node C of the selected node F, which is determined by "BlockingTime (Symbolic Graph 200, Session C, 1 sec.)," needs to be calculated first. The blocking time attributable to the prior node C of node F can be calculated by the following recursive algorithm based on the minimized time T (1 second) and the affected session time associated with all prior nodes of node C:

```
BlockingTime (Symbolic Graph 200, Session C, 1 sec.)
Result = 0
For Prior Session B
    T = Min (1 sec., 5 min.) = 1 sec.
    Result = 0 + BlockingTime (Symbolic Graph 200, Session B,
    1 sec.) + 1 sec.
For Prior Session D
    T = Min (1 sec., 1 hr.) = 1 sec.
    Result = Result + BlockingTime (Symbolic Graph 200, Session D,
    1 sec.) + 1 sec.
Return Result.
```

As shown in FIG. 2, the prior node C has two successive prior nodes, node B and node D. The affected session time associated with node B is 5 minutes and the affected session time associated with node D is 1 hour. When calculating the blocking time attributable to the prior node C of node F, the blocking time attributable to the successive prior node B (that represents the session B in the database system) and the blocking time attributable to successive prior node D (that represents the session D in the database system) needs to be calculated first.

The blocking time attributable to successive prior node B (one of the successive prior nodes of node C) can be calculated by the following recursive algorithm:

```
BlockingTime (Symbolic Graph 200, Session B, 1 sec.)
Result = 0
For Prior Session A
    T = Min (1 sec., 10 min.) = 1 sec.
    Result = 0 + BlockingTime (Symbolic Graph 200, Session A,
    1 sec.) + 1 sec.
Return Result.
```

In this algorithm, because node A is a further successive prior node of the successive prior node B, in order to calculate the blocking time attributable to successive prior node B, the blocking time attributable to the further successive prior node A, which is determined by "BlockingTime (Symbolic Graph 200, Session A, 1 sec.)," needs to be calculated first. Since the further successive prior node A is a back node, the blocking time attributable to the further successive prior node A is 0. As a result, the blocking time attributable to the successive prior node B is 1 second (i.e., Result=0+BlockingTime (Symbolic Graph 200, Session A, 1 sec.)+1 sec).

Similar to the calculation for the blocking time attributable to the successive prior node B, the blocking time attributable to the successive prior node D, i.e., another successive prior node of the prior node C, can be calculated by the following recursive algorithm:

```
BlockingTime (Symbolic Graph 200, Session D, 1 sec.)
Result = 0
For Prior Session E
    T = Min (1 sec., 10 min.) = 1 sec.
    Result = 0 + BlockingTime (Symbolic Graph 200, Session E,
    1 sec.) + 1 sec.
Return Result.
```

Because node D has a further successive prior node E, the blocking time attributable to the further successive prior node E, which is determined by "BlockingTime (Symbolic Graph 200, Session E, 1 sec.)," needs to be calculated first. Since the further successive prior node E is a back node, the blocking time attributable to the further successive prior node E is 0. As a result, the blocking time attributable to the successive prior node D, which is determined by "Result=0+BlockingTime (Symbolic Graph 200, Session E, 1 sec.)+1 sec," is 1 second. Based on the calculated blocking time attributable to the successive prior node B and the blocking time attributable to the successive prior node D, the blocking time attributable to the prior node C can be calculated by "Result=0+BlockingTime (Symbolic Graph 200, Session B, 1 sec.)+1 sec+BlockingTime (Symbolic Graph 200, Session D, 1 sec.)+1 sec)" to be 4 seconds. Thus, based on the calculated blocking time attributable to the prior node C (4 seconds) of node F, the blocking time associated with node F, which is determined by "Result=0+BlockingTime (Symbolic Graph 200, Session C, 1 sec.)+1 sec," is 5 seconds.

In another example, if node C is selected in the symbolic graph 200, the blocking time associated with the node C can be calculated by the following recursive algorithm based on the defined Max_Time (10 minutes) and the affected session time associated with all prior nodes of node C:

```
BlockingTime (Symbolic Graph 200, Session C, 10 min.)
Result = 0
For Prior Session B
    T = Min (10 min., 5 min.) = 5 min.
    Result = 0 + BlockingTime (Symbolic Graph 200, Session B,
    5 min.) + 5 min.
For Prior Session D
    T = Min (10 min., 1 hr.) = 10 min.
    Result = Result + BlockingTime (Symbolic Graph 200, Session D,
    10 min.) + 10 min.
Return Result.
```

As shown in FIG. 2, node B and node D are the prior nodes of node C. The affected session time associated with node B is 5 minutes and the affected session time associated with node D is 1 hour. In order to obtain the blocking time associated with node C, the blocking time attributable to each of the prior nodes B and D needs to be calculated first. Node A is a successive prior node of the prior node B and node E is a successive prior node of the prior node D. Because node A and node E are back nodes, the blocking time attributable to each of these nodes is 0.

The blocking time attributable to prior node B can be calculated by the following recursive algorithm:

```
BlockingTime (Symbolic Graph 200, Session B, 5 min.)
Result = 0
For Prior Session A
```

```
T = Min (5 min., 10 min.) = 5 min.
Result = 0 + 0 + 5 min. = 5 min.
Return Result = 5 min.
```

The blocking time attributable to the prior node D can be calculated by the following recursive algorithm:

```
BlockingTime (Symbolic Graph 200, Session D, 10 min.)
Result = 0
For Prior Session E
    T = Min (10 min., 10 min.) = 10 min.
    Result = 0 + 0 + 10 min. = 10 min.
Return Result = 10 min.
```

Thus, based on the blocking time attributable to the prior nodes B and D, the blocking time associated with node C, which is determined by "0+BlockingTime (Symbolic Graph 200, Session B, 5 min)+5 min+ BlockingTime (Symbolic Graph 200, Session D, 10 min)+10 min," is 30 minutes.

Similarly, based on the recursive algorithm described above, the blocking time associated each node in the symbolic graph 200 is listed below:
Blocking time associated with node F=5 seconds;
Blocking time associated with node G=10 seconds;
Blocking time associated with node C=30 minutes;
Blocking time associated with node B=10 minutes;
Blocking time associated with node D=10 minutes;
Blocking time associated with node A=0;
Blocking time associated with node E=0.

After obtaining the blocking time associated with each node in the symbolic graph 200, the node that has the longest blocking time can be identified. In this embodiment, node C has the longest blocking time (30 minutes). In one embodiment, node C along with the blocking time associated with node C may be output to a display, e.g., for review by a database administrator. In another embodiment, the longest blocking time of a node along with the normalized blocking time (e.g., dividing the longest blocking time by the defined "Max_Time") may be provided to the database administrator for analysis.

Figure 3:
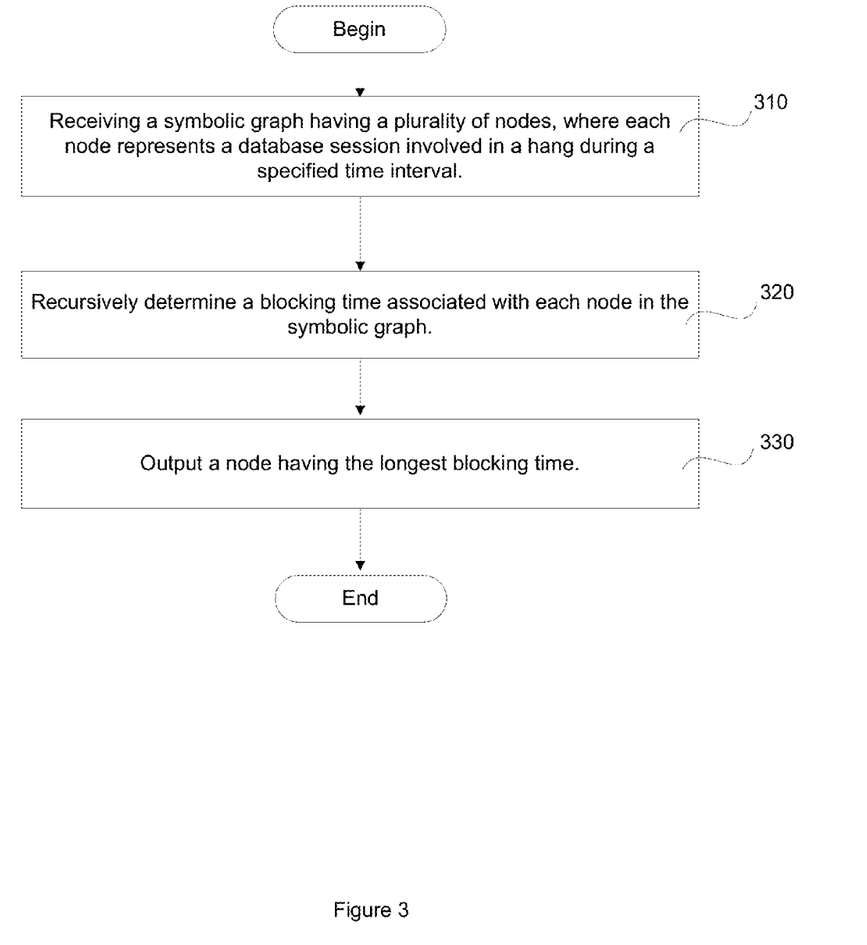
FIG. 3 is a flow chart that shows the method operations for resolving a hang in a database system, in accordance with one embodiment of the present invention.

FIG. 3 is a flow chart that shows the method operations for resolving a hang in a database, in accordance with one embodiment of the present invention.

In operation 310, a symbolic graph having a plurality of nodes is received. Each node in the symbolic graph represents a database session involved in a hang during a specified time interval. In one embodiment, the specified time interval may be provided by the database system or by the database administrator. Alternatively, the specified time interval may be defined by user input. The specified time interval may be measured in any suitable time measurement units, e.g., minutes. In one example, the specified time interval may be defined as 10 minutes. In another example, the specified time interval may be defined as 5 minutes. It is to be understood that the length of the specified time interval can be varied to suit the needs of any particular database system.

In one embodiment, two nodes in the symbolic graph may be coupled together if one node is waiting for a database resource held by the other node for a period of time. The node waiting for the database resource is associated with an affected session time that is equal to the period of time for which the node has been waiting for the database resource held by the other node.

In operation 320, the blocking time associated with each node in the symbolic graph 200 is recursively determined. In one embodiment, after a node in the symbolic graph is selected, the blocking time associated with the selected node is calculated by using a recursive algorithm based on the specified time interval and the affected session time associated with all of the prior nodes of the selected node. The selected node can be any node in the symbolic graph. If the selected node is a back node, the blocking time associated with the back node is 0.

In one embodiment, when calculating the blocking time associated with a selected node in a symbolic graph, the blocking time attributable to each of the prior nodes of the selected node needs to be determined first. If a prior node of the selected node has any successive prior node, the blocking time attributable to each of the successive prior nodes of the prior node needs to be determined first. The calculation of the blocking time attributable to a prior node, a successive prior node, or a further successive prior node continues until the prior node, a successive prior node, or a further successive prior node is a back node.

In operation 330, after the blocking time associated with each node in the symbolic graph is determined, the node having the longest blocking time may be output to, for example, a display for review by a database administrator. In one embodiment, the database session represented by the node having the longest blocking time may be identified as a candidate for elimination. Alternatively, after the blocking time associated with each node in the symbolic graph is determined, the node with the longest blocking time may be automatically eliminated, e.g., by database management software.

The blocking time associated with each node in a symbolic graph may be measured in any suitable time measurement units. In one embodiment, the blocking time associated with each node is measured in microseconds. When the blocking time is measured in microseconds, it is unlikely that there will be a tie for the longest blocking time between two or more nodes in a symbolic graph. Nevertheless, if there is a tie for the longest blocking time between two or more nodes, the situation can be handled in one of several ways. In one scenario, one of the nodes having the longest blocking time can be randomly chosen to be output or automatically eliminated. In another scenario, all of the nodes having the longest blocking time can be output to a display or automatically eliminated.

Figure 4:
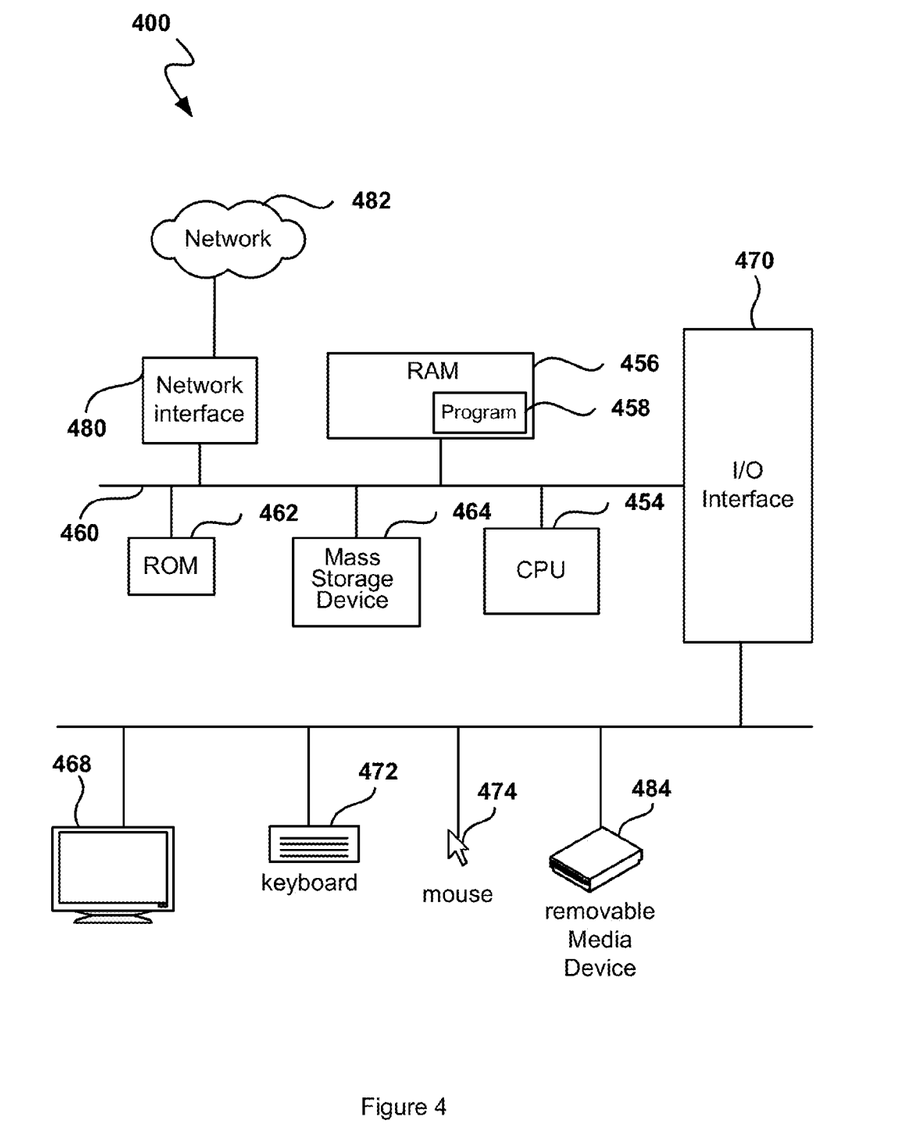
FIG. 4 is a simplified schematic diagram of a computer system for implementing embodiments described herein.

FIG. 4 is a simplified schematic diagram of a computer system 400 for implementing embodiments described herein. It should be appreciated that the methods described herein may be performed with a digital processing system, such as a conventional, general-purpose computer system. Special purpose computers, which are designed or programmed to perform only one function, may be used in the alternative. The computer system 400 includes a central processing unit (CPU) 454, which is coupled through bus 460 to random access memory (RAM) 456, read-only memory (ROM) 462, and mass storage device 464. Computer program 458 for identifying a top blocking database session resides in random access memory (RAM) 456, but can also reside in mass storage device 464.

Mass storage device 464 represents a persistent data storage device such as a floppy disc drive or a fixed disc drive, which may be local or remote. Network interface 480 provides connections via network 482, allowing communications with other devices. It should be appreciated that CPU 454 may be embodied in a general-purpose processor, a special purpose processor, or a specially programmed logic device. Input/output (I/O) interface 470 provides communication with different peripherals and is connected with CPU 454, RAM 456, ROM 462, and mass storage device 464, through bus 460. Sample peripherals include display 468, keyboard 472, cursor control or mouse 474, removable media device 484, etc.

Display 468 is configured to display the user interfaces described herein. Keyboard 472, cursor control 474, removable media device 484, and other peripherals are coupled to I/O interface 470 in order to communicate information in command selections to CPU 454. It should be appreciated that data to and from external devices may be communicated through I/O interface 470. The embodiments can also be practiced in distributed computing environments where tasks are performed by remote processing devices that are linked through a wire-based or wireless network.

Embodiments may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments can also be fabricated as computer readable code on a non-transitory computer readable medium. The non-transitory computer readable medium is any data storage device that can store data, which can be thereafter be read by a computer system. Examples of the non-transitory computer readable medium include hard drives, network attached storage (NAS), read-only memory, random-access memory, CD-ROMs, CD-Rs, CD-RWs, magnetic tapes and other optical and non-optical data storage devices. The non-transitory computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for resolving a hang in a database, comprising:
receiving a symbolic graph having a plurality of nodes, wherein each node represents a database session involved in the hang during a specified time interval;
recursively determining a blocking time associated with each node in the symbolic graph; and
outputting a node having a longest blocking time, wherein the method is executed by a processor.

2. The method of claim 1, wherein the node having the longest blocking time is output to a display.

3. The method of claim 1, wherein recursively determining the blocking time associated with each node includes,
selecting a node in the symbolic graph; and
calculating the blocking time associated with the selected node by applying a recursive algorithm based on the specified time interval and affected session time associated with all prior nodes of the selected node.

4. The method of claim 3, wherein calculating the blocking time associated with the selected node by applying the recursive algorithm includes,
resetting a result that represents the blocking time associated with the selected node;
determining prior nodes for the selected node; and
if one or more prior nodes are determined for the selected node, for each determined prior node,
choosing a minimized time between the specified time interval and an affected session time associated with the determined prior node,
calculating a blocking time attributable to the determined prior node by applying the recursive algorithm based on the minimized time and affected session time associated with all successive prior nodes of the determined prior node, and
calculating the result by adding the calculated blocking time attributable to the determined prior node with the minimized time and the result.

5. The method of claim 4, wherein calculating the blocking time attributable to the determined prior node by applying the recursive algorithm includes,
recursively calculating a blocking time attributable to each of the successive prior nodes of the determined prior node.

6. The method of claim 1, wherein the outputting the node having a longest blocking time includes,
providing a normalized blocking time for the node having the longest blocking time to a database administrator.

7. The method of claim 1, wherein the specified time interval is set by a database administrator.

8. The method of claim 1, wherein the specified time interval is defined by user input.

9. The method of claim 1, wherein the specified time interval is 10 minutes.

10. A method for resolving a hang in a database, comprising:
receiving a symbolic graph having a plurality of nodes, wherein each node represents a database session involved in the hang during a specified time interval, a first node of the plurality of nodes is associated with an affected session time and is coupled to a second node of the plurality of nodes if the second node has been holding a database resource requested by the first node for a duration of the affected session time;

recursively determining a blocking time associated with each node in the symbolic graph; and eliminating a node having a longest blocking time, wherein the method is executed by a processor.

11. The method of claim 10, wherein recursively determining the blocking time associated with each node includes, selecting a node in the symbolic graph; and calculating the blocking time associated with the selected node by applying a recursive algorithm based on the specified time interval and affected session time associated with all prior nodes of the selected node.

12. The method of claim 11, wherein calculating the blocking time associated with the selected node by applying the recursive algorithm includes, resetting a result that represents the blocking time associated with the selected node;

determining prior nodes for the selected node;

if one or more prior nodes are determined for the selected node, for each determined prior node, choosing a minimized time between the specified time interval and an affected session time associated with the determined prior node, calculating a blocking time attributable to the determined prior node by applying the recursive algorithm based on the minimized time and affected session time associated with all successive prior nodes of the determined prior node, and calculating the result by adding the calculated blocking time attributable to the determined prior node with the minimized time and the result.

13. The method of claim 12, wherein calculating the blocking time attributable to the determined prior node by applying the recursive algorithm includes, recursively calculating a blocking time attributable to each of the successive prior nodes of the determined prior node.

14. The method of claim 10, further comprising:

providing a normalized blocking time for the node having the longest blocking time to a database administrator.

15. The method of claim 10, wherein the first node is a prior node of the second node.

16. A non-transitory computer-readable storage medium having instructions encoded thereon, the instructions, when executed by one or more processors, causing the following operations to be performed:

receiving a symbolic graph having a plurality of nodes, wherein each node represents a database session involved in a hang during a specified time interval;

recursively determining a blocking time associated with each node in the symbolic graph; and outputting a node having a longest blocking time.

17. The computer-readable storage medium of claim 16, wherein recursively determining the blocking time associated with each node based on the specified time interval includes, selecting a node in the symbolic graph; and calculating the blocking time associated with the selected node by applying a recursive algorithm based on the specified time interval and affected session time of all prior nodes of the selected node.

18. The computer-readable storage medium of claim 17, wherein calculating the blocking time associated with the selected node by applying the recursive algorithm includes, resetting a result that represents the blocking time associated with the selected node;

determining prior nodes for the selected node; and if one or more prior nodes are determined for the selected node, for each determined prior node, choosing a minimized time between the specified time interval and an affected session time associated with the determined prior node, calculating a blocking time attributable to the determined prior node by applying the recursive algorithm based on the minimized time and affected session time associated with all successive prior nodes of the determined prior node, and calculating the result by adding the calculated blocking time attributable to the determined prior node with the minimized time and the result.

19. The computer-readable storage medium of claim 18, wherein calculating the blocking time attributable to the determined prior node by applying the recursive algorithm includes, recursively calculating a blocking time attributable to each of the successive prior nodes of the determined prior node.

20. The computer-readable storage medium of claim 16, wherein the specified time interval is defined by user input.

* * * * *